(12) United States Patent
Saraf

(10) Patent No.: US 12,413,636 B2
(45) Date of Patent: Sep. 9, 2025

(54) METHODS, SYSTEMS AND COMPUTER PROGRAM PRODUCTS FOR DYNAMIC PROVISIONING OF PROCESSING FUNCTIONALITY FOR CLOUD BASED SOFTWARE APPLICATION EXECUTION

(71) Applicant: NOW.GG, INC., Campbell, CA (US)

(72) Inventor: Suman Saraf, Gurgaon (IN)

(73) Assignee: NOW.GG, INC., Campbell, CA (US)

( * ) Notice: Subject to any disclaimer, the term of this patent is extended or adjusted under 35 U.S.C. 154(b) by 0 days.

(21) Appl. No.: 17/962,437

(22) Filed: Oct. 7, 2022

(65) Prior Publication Data

US 2023/0112190 A1    Apr. 13, 2023

Related U.S. Application Data

(60) Provisional application No. 63/253,914, filed on Oct. 8, 2021.

(51) Int. Cl.
*H04L 67/1008* (2022.01)
*H04L 45/42* (2022.01)
*H04L 67/101* (2022.01)

(52) U.S. Cl.
CPC .......... *H04L 67/1008* (2013.01); *H04L 45/42* (2013.01); *H04L 67/101* (2013.01)

(58) Field of Classification Search
CPC ... H04L 67/1008; H04L 67/101; H04L 45/42; H04L 67/10; H04L 63/20; H04L 63/10; H04L 67/1097; H04L 41/0806; G06F 9/45558; G06F 2009/4557; H04W 4/50
See application file for complete search history.

(56) References Cited

U.S. PATENT DOCUMENTS

| | | | |
|---|---|---|---|
| 8,935,317 B2 * | 1/2015 | Jain | G06F 9/5094 718/1 |
| 9,433,862 B2 | 9/2016 | Bruno, Jr. et al. | |
| 9,979,780 B1 | 5/2018 | Faibish et al. | |
| 2020/0206636 A1 | 7/2020 | Schultz et al. | |

* cited by examiner

*Primary Examiner* — Ryan J Jakovac
(74) *Attorney, Agent, or Firm* — The Webb Law Firm

(57) ABSTRACT

Provided is a method for dynamic provisioning of processing functionality corresponding to an instance of a cloud based software application. The method includes assigning a plurality of computing devices to the instance of a cloud based software application. A first cloud computing server is assigned for execution of a first set of software application program instructions corresponding to the instance of the cloud based software application and a second computing device is assigned for execution of a second set of software application program instructions corresponding to the instance of the cloud based software application. One of the first cloud services server and the second computing device is selected as an instruction implementation device for execution of a software application program instruction and the software application program instruction is routed to the selected instruction implementation device for execution.

13 Claims, 8 Drawing Sheets

METHODS, SYSTEMS AND COMPUTER PROGRAM PRODUCTS FOR DYNAMIC PROVISIONING OF PROCESSING FUNCTIONALITY FOR CLOUD BASED SOFTWARE APPLICATION EXECUTION

CROSS-REFERENCE TO RELATED APPLICATION

This application claims priority to U.S. Provisional Patent Application No. 63/253,914 filed Oct. 8, 2021, the disclosure of which is hereby incorporated by reference in its entirety.

BACKGROUND OF THE INVENTION

Field of the Invention

The present invention relates to provisioning of processing functionality in cloud based software services. In particular, the present invention provides methods, systems and computer program products for dynamic provisioning of processing functionality for cloud based software program execution, and in an embodiment for cloud based execution of gaming software.

Description of Related Art

With the increase in availability of affordable computing hardware, it has become commonplace for individuals to use computing devices or data processing devices for accessing cloud based, or network based, services.

In a typical cloud based software services environment, one or more client terminals may interface through a network (such as the Internet), with a server (or with any other computing device located within the cloud), which is configured to provide cloud based service(s) to a requesting client terminal, in providing the cloud based software service(s), an instance of a software application required by a requesting client terminal is installed and run on the server, and video and audio output data from the software application is streamed to and rendered on the requesting client terminal. The inputs received from a user or operator of the requesting client terminal are in turn transmitted back to the server and are used to control execution of the software application that is running on the server.

Performance related problems arise in connection with provision of cloud based software services—particularly where high network communication overheads, high network latency and/or low network bandwidth results in unacceptable delays in delivery of cloud based software services from a server or computing device (within the cloud) which is assigned the task of executing an instance of a software application. The high network communication overheads, high network latency and/or low network bandwidth invariably results in sub-optimal execution of the instance of the software application, and/or slow delivery of streamed data to a requesting client terminal—and consequently resulting in a poor user experience.

There is accordingly a need to ensure that a cloud based software services environment can dynamically adapt to real time characteristics of a communication network and/or to detected end point device characteristics (e.g. characteristics of a client terminal requesting a cloud based software service) to optimize delivery of requested cloud based software services to the end point device (such as a requesting client terminal), in a manner that is efficient and opaque to the end-user.

SUMMARY OF THE INVENTION

The present invention relates to dynamic provisioning of processing functionality for cloud based software program execution. The invention provides methods, systems and computer program products for dynamic provisioning of processing functionality for cloud based software program execution—for implementation within cloud based software service environments, and in a specific embodiment, for implementation within cloud gaming systems.

The invention provides a method for dynamic provisioning of processing functionality corresponding to an instance of a cloud based software application. The instance of the cloud based software application is executed at a cloud services server system, such that output data from the instance of the cloud based software application is streamed to and rendered on a client terminal that is interfaced with the cloud services server system through a network. The method comprises the steps of (i) initiating a network communication session between the client terminal and cloud services server system, for delivery of streaming data that is output from the instance of the cloud based software application, from the cloud services server system to the client terminal, (ii) assigning a plurality of computing devices to the instance of the cloud based software application, the plurality of computing devices comprising at least a first cloud services server, and a second computing device, (iii) assigning the first cloud computing server for execution of a first set of software application program instructions corresponding to the instance of the cloud based software application, the first set of software application program instructions having a first set of attributes, (iv) assigning the second computing device for execution of a second set of software application program instructions corresponding to the instance of the cloud based software application, the second set of software application program instructions having a second set of attributes, (v) receiving a first software application program instruction for execution, wherein said first software application program instruction is associated with functionality of the instance of the cloud based software application, (vi) selecting one of the first cloud services server and the second computing device as an instruction implementation device, for execution of the first software application program instruction, wherein (a) the first cloud services server is selected as the instruction implementation device in response to determining that the first set of software application program instructions includes the first software application program instruction, and (b) the second computing device is selected as the instruction implementation device in response to determining that the second set of software application program instructions includes the first software application program instruction, and (vii) routing the first software application program instruction to the selected instruction implementation device.

The invention additionally provides a cloud services server system for dynamic provisioning of processing functionality corresponding to an instance of a cloud based software application. The instance of the cloud based software application is executed at the cloud services server system, wherein output data from the instance of the cloud based software application is streamed to and rendered on a client terminal that is interfaced with the cloud services server system through a network. The cloud services server system comprises a processor, and a non-transitory memory. The processor is configured to implement the steps of (i) establishing a network communication session between the client terminal and the cloud services server system, for delivery of streaming data that is output from the instance of the cloud based software application, from the cloud services server system to the client terminal, (ii) assigning a plurality of computing devices to the instance of the cloud based software application, the plurality of computing devices comprising at least a first cloud services server, and a second computing device, (iii) assigning the first cloud computing server for execution of a first set of software application program instructions corresponding to the instance of the cloud based software application, the first set of software application program instructions having a first set of attributes, (iv) assigning the second computing device for execution of a second set of software application program instructions corresponding to the instance of the cloud based software application, the second set of software application program instructions having a second set of attributes, (v) receiving a first software application program instruction for execution, wherein said first software application program instruction is associated with functionality of the instance of the cloud based software application, (vi) selecting one of the first cloud services server and the second computing device as an instruction implementation device, for execution of the first software application program instruction, wherein (a) the first cloud services server is selected as the instruction implementation device in response to determining that the first set of software application program instructions includes the first software application program instruction, and (b) the second computing device is selected as the instruction implementation device in response to determining that the second set of software application program instructions includes the first software application program instruction, and (vii) routing the first software application program instruction to the selected instruction implementation device.

The invention also provides a computer program product for dynamic provisioning of processing functionality corresponding to an instance of a cloud based software application, wherein the instance of the cloud based software application is executed at a cloud services server system, and wherein output data from the instance of the cloud based software application is streamed to and rendered on a client terminal that is interfaced with the cloud services server system through a network. The computer program product comprising a non-transitory computer readable medium having a computer readable program code embodied therein, the computer readable program code comprising instructions for implementing the steps of (i) initiating a network communication session between the client terminal and cloud services server system, for delivery of streaming data that is output from the instance of the cloud based software application from the cloud services server system to the client terminal, (ii) assigning a plurality of computing devices to the instance of the cloud based software application, the plurality of computing devices comprising at least a first cloud services server, and a second computing device, (iii) assigning the first cloud computing server for execution of a first set of software application program instructions corresponding to the instance of the cloud based software application, the first set of software application program instructions having a first set of attributes, (iv) assigning the second computing device for execution of a second set of software application program instructions corresponding to the instance of the cloud based software application, the second set of software application program instructions having a second set of attributes, (v) receiving a first software application program instruction for execution, wherein said first software application program instruction is associated with functionality of the instance of the cloud based software application, (vi) selecting one of the first cloud services server and the second computing device as an instruction implementation device, for execution of the first software application program instruction, wherein (a) the first cloud services server is selected as the instruction implementation device in response to determining that the first set of software application program instructions includes the first software application program instruction, and (b) the second computing device is selected as the instruction implementation device in response to determining that the second set of software application program instructions includes the first software application program instruction, and (vii) routing the first software application program instruction to the selected instruction implementation device.

DESCRIPTION OF THE INVENTION

The invention provides for dynamic provisioning of processing functionality for cloud based software program execution. In various embodiments, the invention provides methods, systems and computer program products for dynamic provisioning of processing functionality for cloud based software program execution. The solutions of the present invention may be implemented within cloud based software services solutions, and/or within cloud based gaming solutions.

Figure 1:
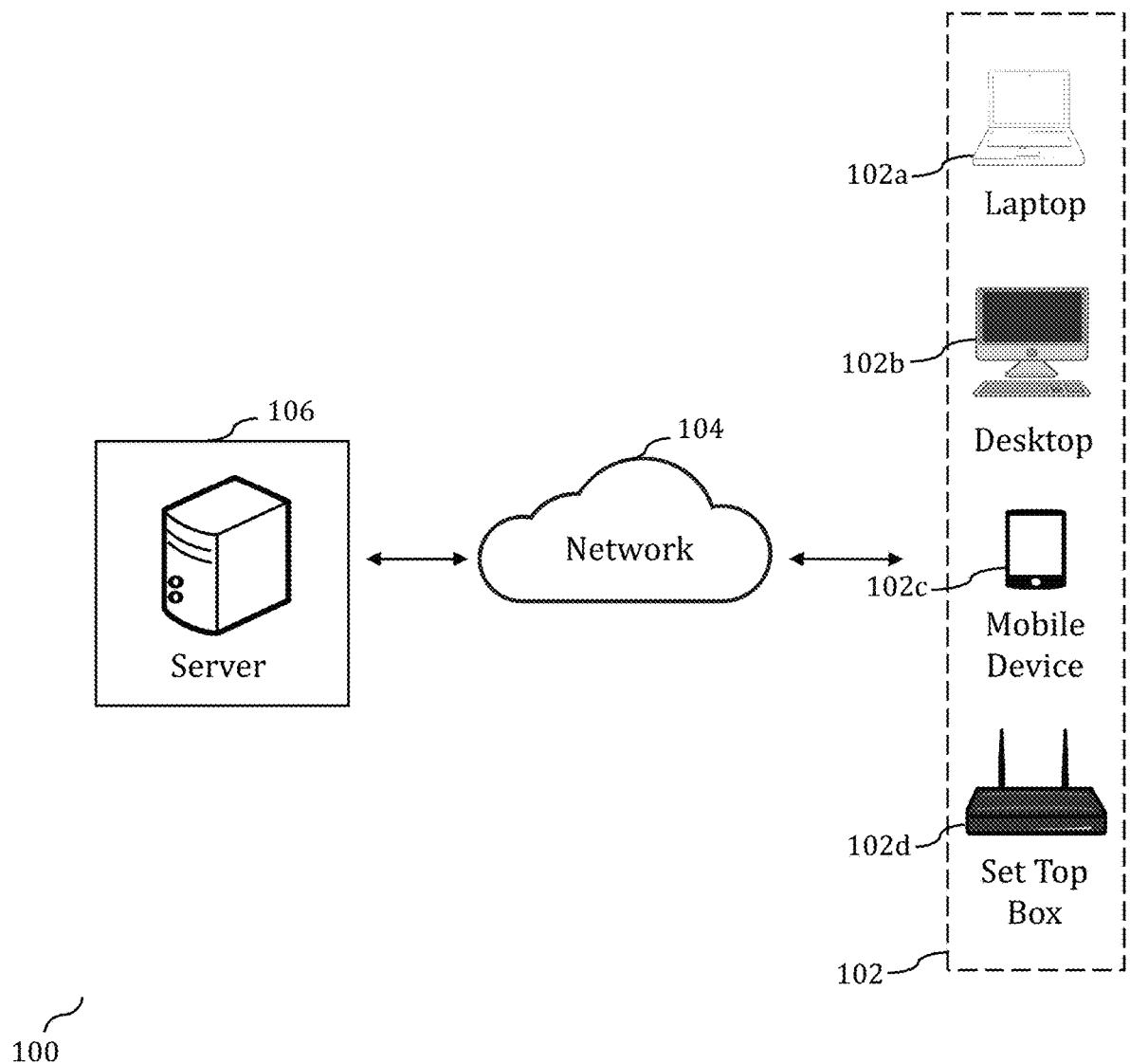
FIGS. 1 and 2 illustrate system environments of a kind that may be used to implement the teachings of the present invention.

FIG. 1 illustrates a system environment 100 of a kind that may be used for implementing cloud based, or network based, services in accordance with the teachings of the present invention, System environment 100 comprises one or more client terminals 102 (for example, any of laptop 102a, desktop 102b, mobile device 102c and/or set top box 102d) interfacing through network 104, with a server 106 (which server may comprise any cloud based computing device). Server 106 may be configured to provide cloud based service(s) to a requesting client terminal 102, wherein a software application required by client terminal 102 is installed and run on server 106, and video and audio output data from the software application is streamed to and rendered on client terminal 102. The inputs received from a user or operator of the client terminal 102 are in turn transmitted back to server 106 and are used to control execution of the software application that is running on the server 106.

So for example, in a cloud based gaming environment, a game application software is installed and run on a cloud based computing device configured to run the game software—and which is integrated or coupled with server 106. The game application software is run on the computing device and video and audio gameplay data is streamed from the computing device (optionally through server 106) to a client terminal 102, where it is rendered for display and/or audio playback. A gameplayer who is operating client terminal 102 uses the interface controls of client terminal 102 to provide gameplay inputs—which are streamed back to the computing device on which the game software is being executed and is used as gameplay control inputs for the game software that is being run on said computing device. As a result, gameplayers from any location can play a video game or a computer game without having to secure specialized video game consoles, software or graphics processing hardware—and relying instead on securing on-demand execution of the game application software by a cloud based server or cloud based computing device.

Figure 2:
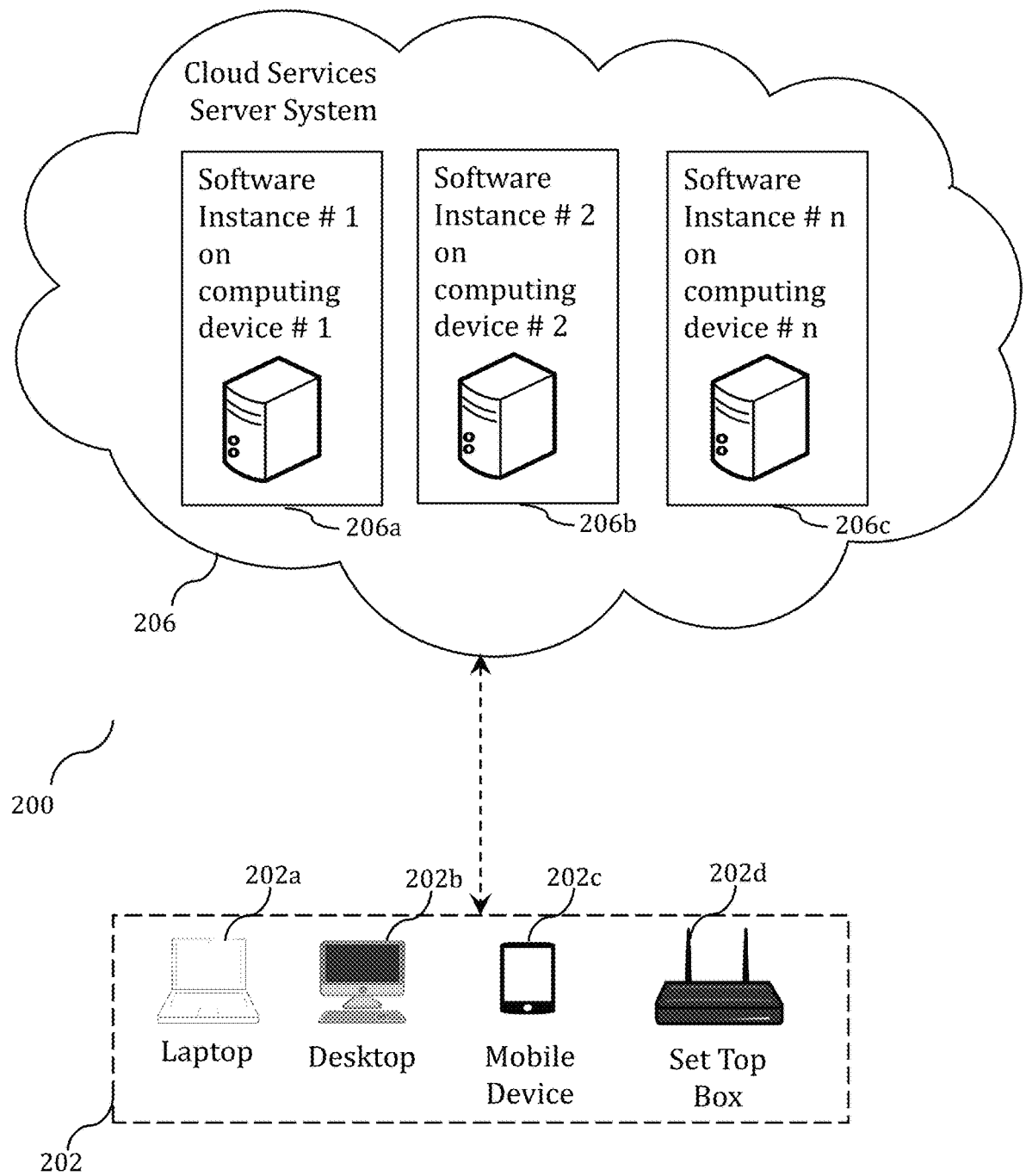

FIG. 2 illustrates system environment 200—which comprises one or more client terminals 202 (for example, any of laptop 202*a*, desktop 202*b*, mobile device 202*c* and/or set top box 202*d*) interfacing through a communication network such as a data network or the internet (not shown), with a cloud services server system 206. The cloud services server system 206 may comprise (or may be coupled with) a plurality of discrete or distinct computing systems (computing device #1, computing device #2 upto computing device #n)—each of which may be configured to be provisioned with, and to instantiate and run a discrete instance of one or more software applications. As a result, cloud services server system 206 may utilize the plurality of discrete or distinct computing systems to simultaneously run software instance #1 (206*a*), software instance #2 (206*b*), upto software instance If n (206*c*)—such that video and/or audio data from each of these software instances 206*a* to 206*c* may be streamed to one or more requesting client terminals 202*a* to 202*d*.

By way of an example:

client terminal 202*a* may request cloud services server system 206 for cloud based execution of a first software application—and cloud services server system 206 may respond by (i) instantiating an instance of this first software application (software instance #1) to run on a first computing device (hardware device ∩1), and (ii) streaming video and/or audio data from the instance of the first software application to client terminal 202*a*.

client terminal 202*b* may request cloud services server system 206 for cloud based execution of a second software application (which may be the same as the first software application, or may comprise a different software application)—and cloud services server system 206 may respond by (i) instantiating an instance of this second software application (software instance #2) to run on a second computing device (computing device #2), and (ii) streaming video and/or audio data from the instance of the second software application to client terminal 202*b* client terminal 202*c* may request cloud services server system 206 for cloud based execution of an $n^{th}$ software application (which may be the same as either of the first or second software applications, or may be different from both)—and cloud services server system 206 may respond by (i) instantiating an instance of this $n^{th}$ software application (software instance #n) to run on a $n^{th}$ computing device (computing device #n), and (ii) streaming video and/or audio data from the instance of the $n^{th}$ software application to client terminal 202*c*.

In an improved implementation of cloud based software services provisioning—it has been discovered that there may be circumstances where it may be non-optimal or otherwise undesirable to execute certain software instructions relating to the software application, or to store certain types of data relating to the user or software application in the cloud. Examples include where execution of certain types of software instructions on the cloud result in undesirable latency at the client terminal, or where execution of such software instructions may result in exposure of confidential user data to the risk of misappropriation through the cloud.

This problem is addressed by selectively assigning discrete sub-sets of software instructions (that comprises the overall set of software instructions associated with a software application) across multiple computing devices, such that each of the multiple devices provides a part of the functionality of a software instance that has been requested by a client terminal. In a particular embodiment, the client terminal (that has requested cloud based execution of an instance of a software application) itself may be used to execute one or more sub-sets of software instructions associated with a software application, while other sub-sets of the software instructions associated with the software application are executed by one or more cloud based servers. In other words, the hardware of multiple computing devices (which multiple computing devices may or may not include the requesting client terminal) is used for execution of software program instructions that are associated with (or that are pare of) the software application. For example, a first server device may be used for execution of a first set of software program instructions associated with (or that are part of) the software application and which are of a first type or which have a first set of attributes. The hardware of a second server device or of a requesting client terminal may be used for execution of software program instructions associated with (or that are part of) the software application and which are of a second type or which have a second set of attributes. It will be understood that selection of the concerned server device and/or client terminal for execution of specific software program instructions may be determined based on any number of different factors—including for example data security concerns, latency concerns, network communication speed concerns etc.

Any output from execution of software instructions by the selected server device and/or client terminal may be (directly or indirectly) routed to a user interface application that is being implemented on the client terminal—for presentation of the output to a user or operator of the client terminal.

It would be understood that implementation of the invention requires a first computing device configured to implement a first set of software code instructions, and a second computing device (which may comprise a cloud based device or the client terminal itself) configured to implement a second set of software code instructions that is distinct from (i.e. different from) the first set of software code instructions. Requests for execution of software code instructions for the purposes of implementing/executing an instance of a software application associated with the first and second set of software code instructions, are routed for execution to the processor of an assigned computing device or an assigned client terminal, depending on whether the software code instructions identified within the request are part of the first set of software code instructions or the second set of software code instructions.

Figure 3:
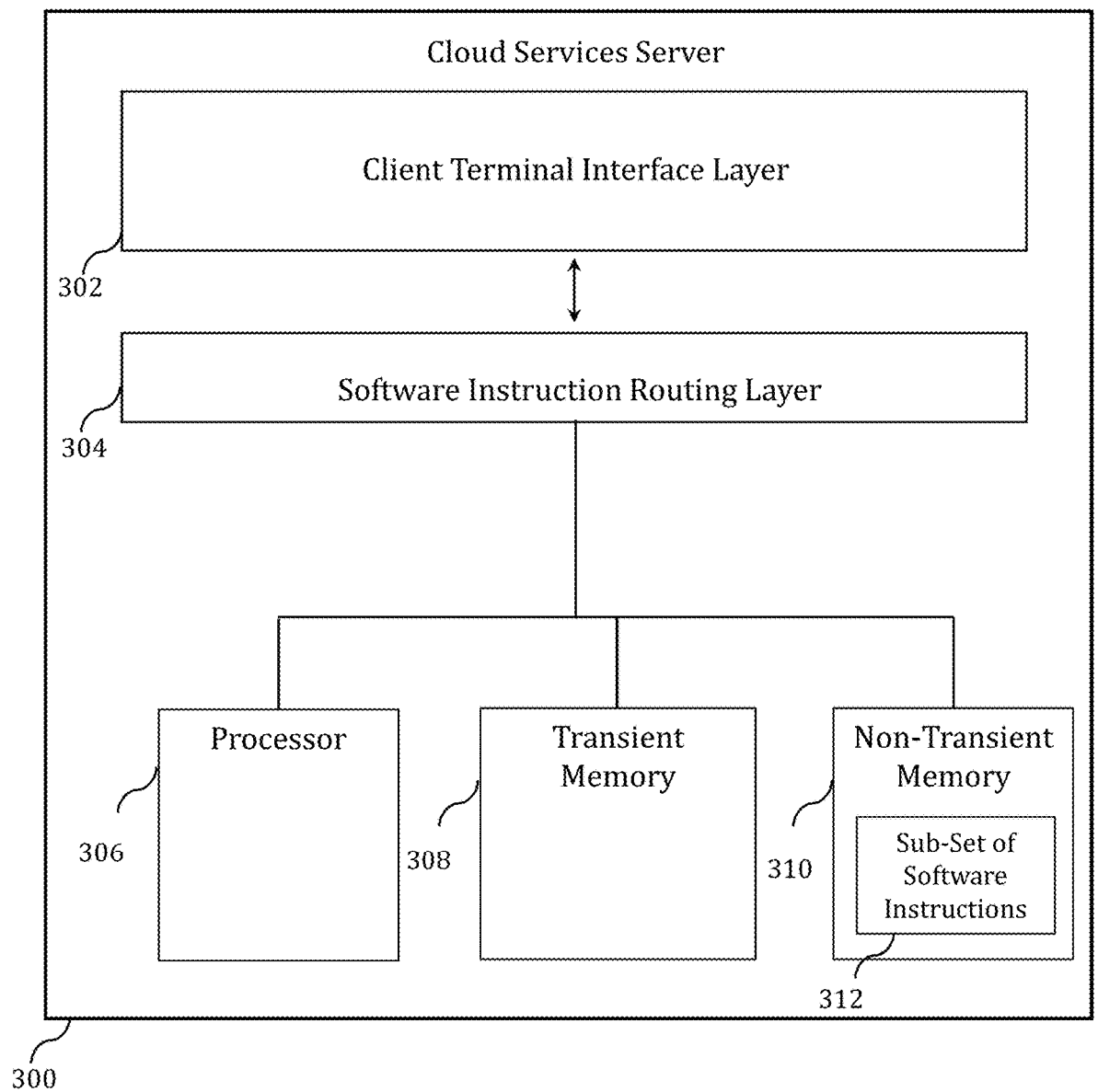
FIG. 3 illustrates an embodiment of a cloud services server.

FIG. 3 illustrates an embodiment of a cloud services server 300 configured to implement the distributed cloud based services delivery that has been briefly described above. It would be understood that either (i) at least two instances of cloud services server 300, or (ii) at least one instance of a cloud services server 300 and the requesting client terminal itself (for example, client terminal 400)—may be used for implementing the distributed cloud based services delivery described above.

Any output from execution of software instructions by either the client terminal or the cloud services server may be routed to a user interface application that is being implemented on the client terminal—for presentation of the output to a user or operator of the client terminal.

Cloud services server 300 may comprise a client terminal interface layer 302 comprising a processor implemented network communication interface layer that enables the cloud services server 300 to communicate with one or more client terminals for the purposes of providing cloud services to such client terminal(s). Any and all data communications between cloud services server 300 and one or more client terminals for the purposes of providing cloud services to said client terminals is routed through client device interface layer 302.

In the illustrated embodiment, cloud services server 300 comprises a processor 306, a transient memory 308 and a non-transient memory 310. Non-transient memory 310 comprises memory storage that may be used to store a sub-set of software code instructions 312.

Cloud services server 300 may optionally include a processor implemented software instruction routing layer 304 configured to implement one or more of the steps of the method of FIG. 5 that are discussed in more detail subsequently, including the steps of (i) receiving for execution, a request for implementing a software code instruction corresponding to an instance of a software application that is under execution within the cloud services server 300, (ii) analyzing the request for implementing the software code instruction, and determining whether the software code instruction is stored on or executable at the cloud services server 300, or alternatively whether the software code instruction is stored at another at cloud services server or at a client terminal, and (iii) routing the request for implementing the software code instruction to the relevant cloud services server or to the client terminal at which the software code instruction is stored, for execution.

Any output from execution of software instructions by either the client terminal or the cloud services server is routed to a user interface application that is being implemented on the client terminal—for presentation of the output to a user or operator of the client terminal.

It would be understood that implementation of the above solution for distributed execution of cloud based instance of a software application requires (i) a first cloud services server to be configured to implement a first set of software code instructions, and (ii) a second cloud services server or a requesting client terminal to be configured to implement a second set of software code instructions that is distinct from (i.e. different from) the first set of software code instructions—wherein each of the first and second set of software code instructions are associated with (or are a part of) the software application. The request for execution of software code instructions is routed for execution to the processor of a relevant cloud services server or a client terminal depending on whether the software code instructions identified within the request are part of a set of software code instructions stored at such cloud services server or at the client terminal.

Figure 4:
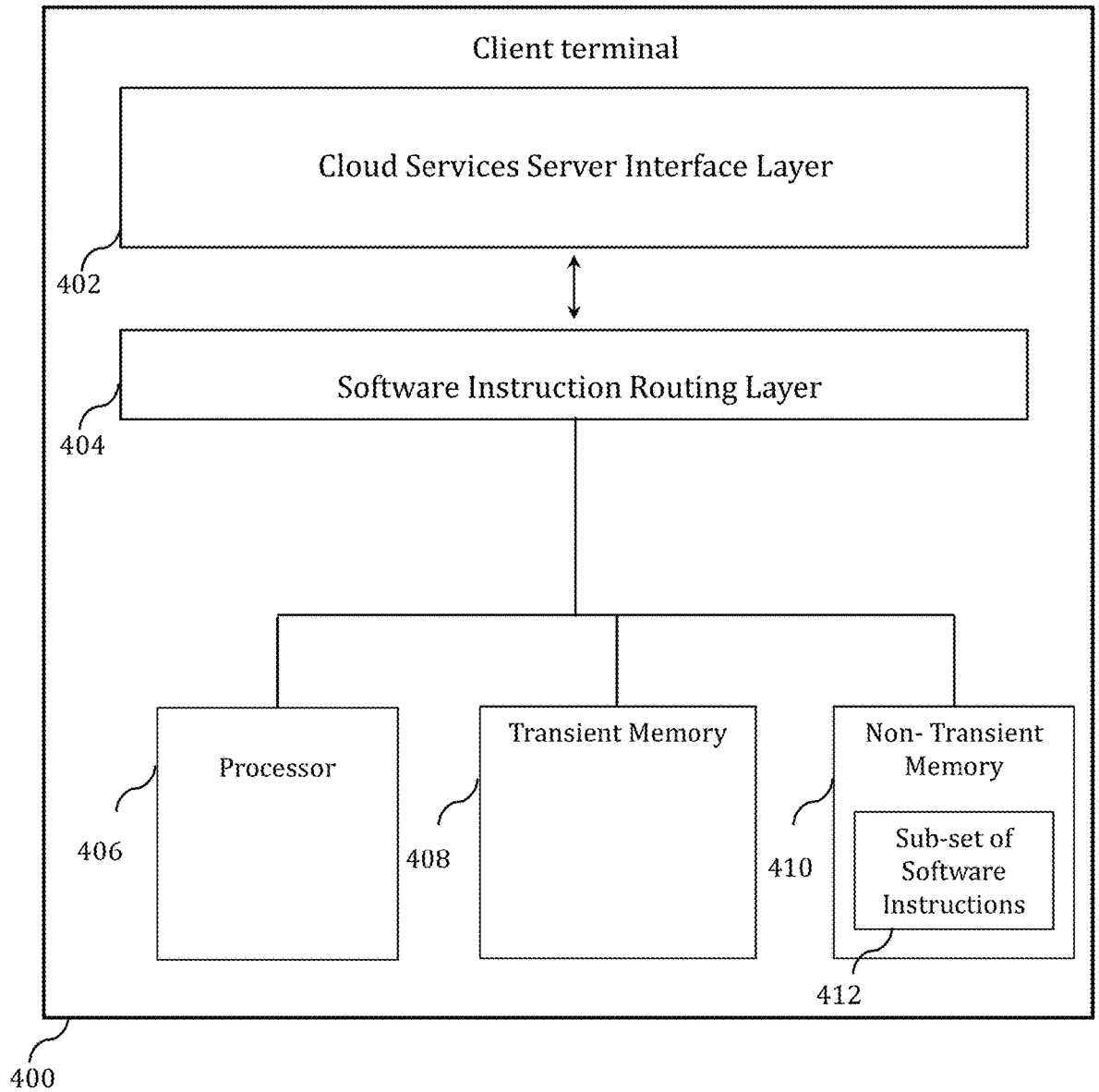
FIG. 4 illustrates an embodiment of a client terminal.

FIG. 4 illustrates an embodiment of a client terminal 400 configured in accordance with the teachings of the present invention. Client terminal 400 comprises a cloud services server interface layer 402 comprising a processor implemented network communication interface layer that enables the cheat terminal 400 to communicate with one or more cloud services servers (e.g. cloud services server 300) for the purposes of obtaining cloud based software services at the client terminal 400. Any and all data communications between client terminal 400 and any cloud services server 300 for the purposes of requesting or receiving cloud based software services at said client terminal 400 is routed through cloud services server interface layer 402.

In the illustrated embodiment, client terminal 400 comprises a processor 406, a transient memory 408 and a non-transient memory 410. Non-transient memory 410 comprises memory storage that includes a stored second set of software code instructions 412.

Client terminal 400 may optionally include a processor implemented software instruction routing layer 404 configured to implement one or more of the steps of the method of FIG. 5 that are discussed in more detail subsequently, including the steps of (i) receiving for execution, a request for implementing a software code instruction corresponding to an instance of a software application that is under execution, (ii) analyzing the request for implementing the software code instruction, and determining whether the software code instruction is stored on or executable at any cloud services server (e.g. at cloud services server 300) or at client terminal 400, (iii) routing the request for implementing the software code instruction to one of the processor 406 within client terminal 400 or to a cloud services server 300 (e.g. at cloud services server 300), at which the software code instruction is stored for execution.

Figure 5:
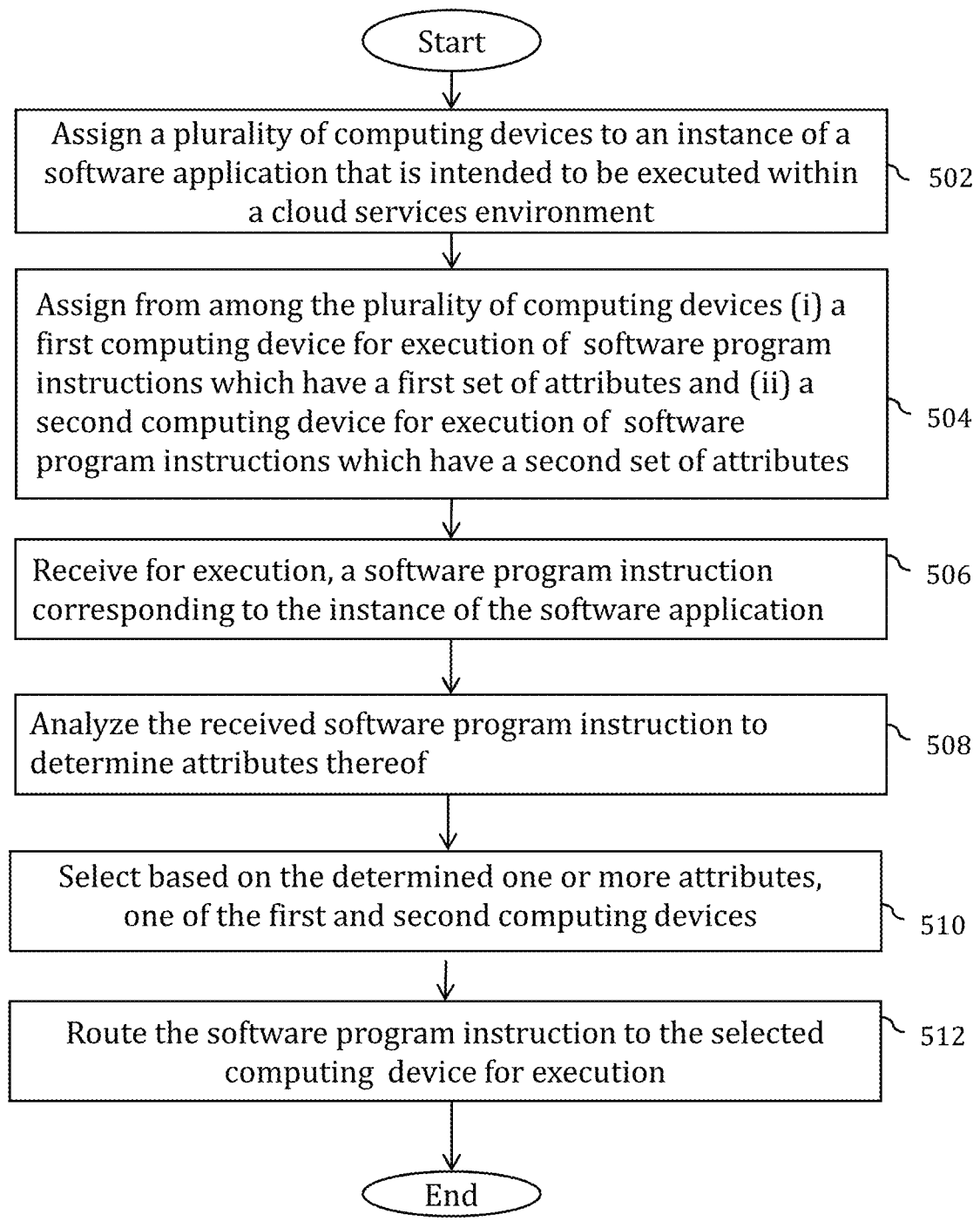
FIG. 5 is a flowchart illustrating a method of routing software instructions for the purposes of cloud based execution of an instance of a software application.

FIG. 5 is a flowchart illustrating a method of implementing the distributed cloud based services delivery that has been briefly described above.

Step 502 comprises assigning a plurality of computing devices to an instance of a software application that is intended to be executed within a cloud services environment. In an embodiment, each of the plurality of computing devices has at least one hardware capability or hardware configuration attribute that is not shared by the other computing devices within said plurality of computing devices. In an embodiment, the plurality of computing devices may comprise at least two discrete cloud services servers (e.g. two instances of cloud services servers 300 as described in connection with FIG. 3). In another embodiment, the plurality of computing devices may comprise at least one cloud services server (e.g. cloud services servers 300 as described in connection with FIG. 3) and at least one client terminal (e.g. client terminal 400 as described in connection with FIG. 4) that has requested execution of an instance of a software application within a cloud services environment.

Step 504 comprises assigning from among the plurality of computing devices (i) a first computing device for execution of a first set of software application program instructions which have a first set of attributes and (ii) a second computing device for execution of a second set of software application program instructions which have a second set of attributes—which are different from the first set of attributes.

Step 506 comprises receiving for execution, a software application program instruction corresponding to the instance of the software application that is under execution within the cloud services environment.

Step 508 comprises analyzing the received software application program instruction and determining attributes of the received software application program instruction.

Step 510 comprises selecting based on the determined one or more attributes of the software application program instruction, one of the first and second computing devices, for execution of the software application program instruction. In the event (i) the determined one or more attributes of the software application program instruction matches the first set of attributes, step 510 comprises selecting the first computing device, and (ii) the determined one or more attributes of the software application program instruction matches the second set of attributes, step 510 comprises selecting the second computing device for execution of the software program instruction.

Figure 6A:
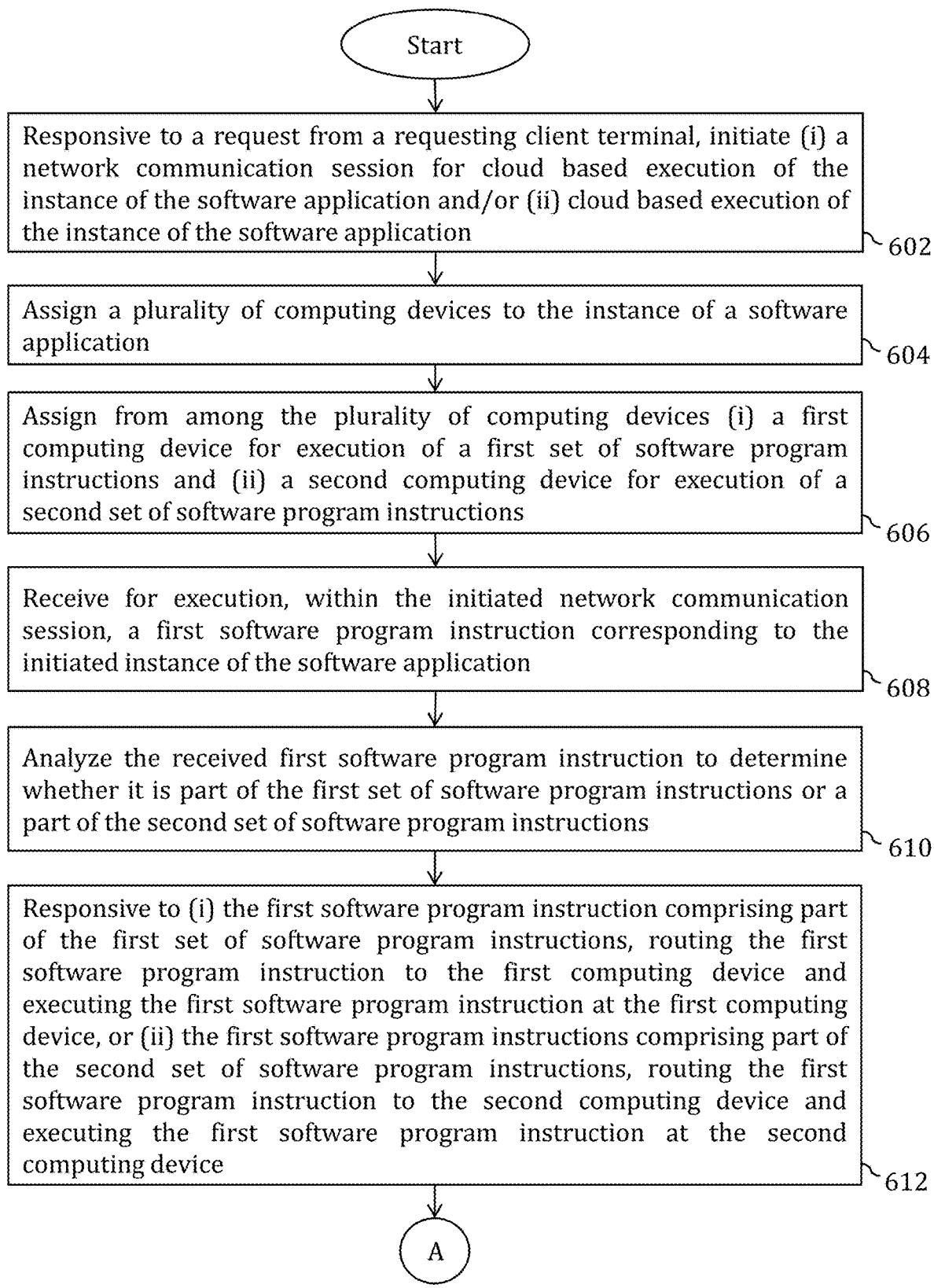
FIGS. 6A and 6B comprise a flowchart illustrating a method for dynamic provisioning of processing functionality for a cloud executed instance of a software application.
Figure 6B:
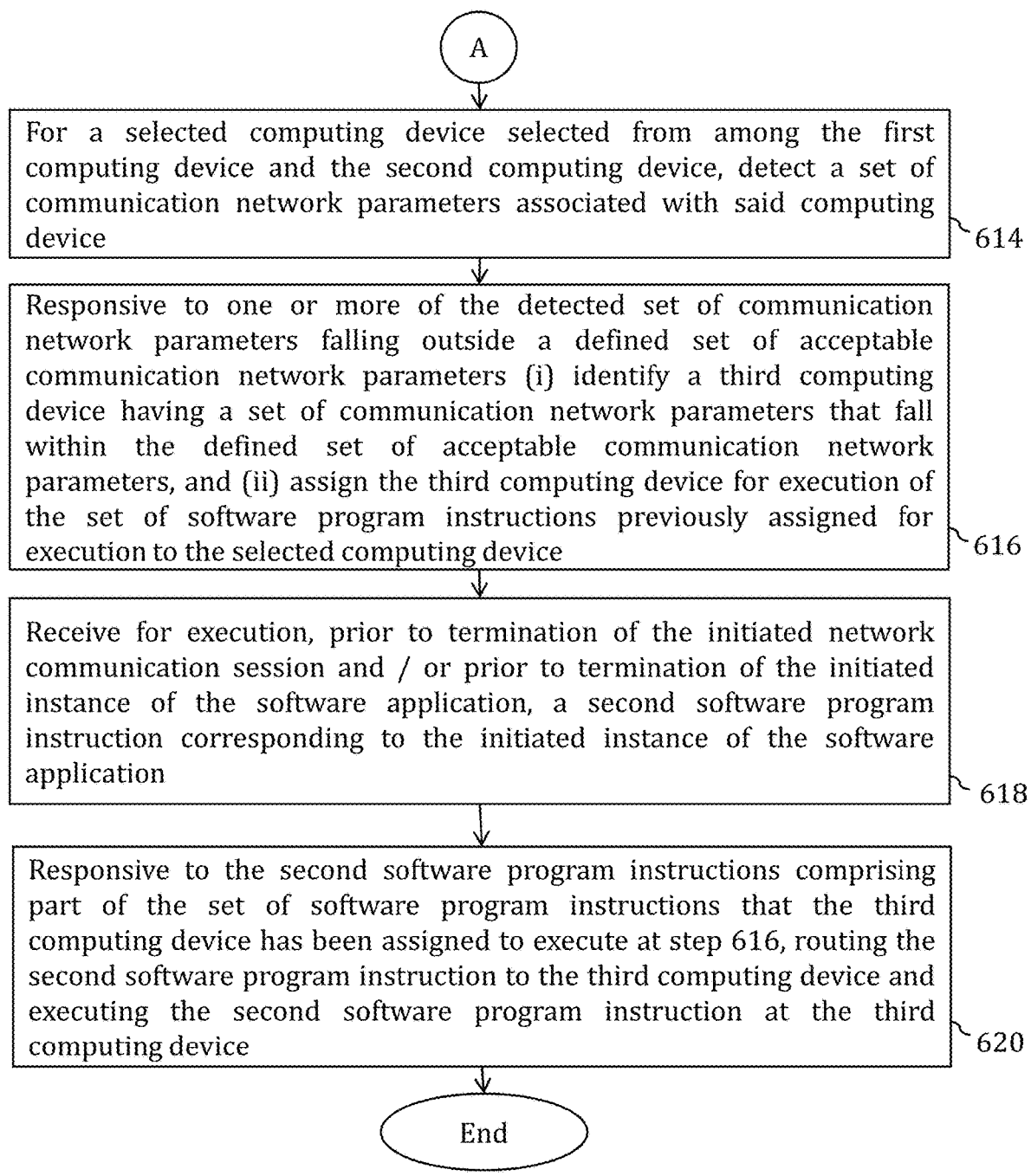

Step 512 comprises routing the software application program instruction to the selected computing device for execution, FIGS. 6A and 6B comprise a flowchart illustrating a method for dynamic provisioning of processing functionality for a cloud executed instance of a software application. The method of FIGS. 6A and 6B may in certain embodiments, be implemented using the cloud services server 300 (of FIG. 3) and/or the client terminal 400 (of FIG. 4).

Step 602 comprises responding from a requesting client terminal to a request for provision of an instance of a cloud executed software application, by initiating (i) a network communication session for cloud based execution of the instance of the software application and/or (ii) cloud based execution of the instance of the software application.

Step 604 comprises assigning a plurality of computing devices to the instance of a software application—for the purposes of executing the instance of the software application. In an embodiment, the plurality of computing devices may comprise at least a first computing device comprising a cloud services server 300, and a second computing device comprising either a second cloud services server 300 or the requesting client terminal 400.

Step 606 comprises assigning from among the plurality of computing devices (that have been assigned to the instance of a software application, at step 604):
 (i) the first computing device for execution of a first set of software program instructions that are associated with (or that are part of) the software application
 (ii) the second computing device for execution of a second set of software program instructions that are associated with (or that are part of) the software application The first and second sets of software program instructions may comprise discrete sets of software program instructions.

Step 608 comprises receiving for execution, within the initiated network communication session, a first software program instruction corresponding to the initiated instance of the software application.

Step 610 comprises analyzing the received first software program instruction to determine whether it is part of the first set of software program instructions or a part of the second set of software program instructions Step 612 comprises responding to (i) the first software program instruction comprising part of the first set of software program instructions, by routing the first software program instruction to the first computing device and executing the first software program instruction at the first computing device, or (ii) the first software program instructions comprising part of the second set of software program instructions, by routing the first software program instruction to the second computing device and executing the first software program instruction at the second computing device.

Step 614 comprises selecting a computing device selected from among the first computing device and the second computing device, and detecting a set of communication network parameters associated with said computing device. The communication network parameters but is not limited to any of such as, but not limited to, the time of day, a current traffic load or bandwidth on a particular network link or network, a received signal strength indication (RSSI), the number of communication sessions simultaneously being handled by the computing device, a particular quality of service (QoS) standard associated with the computing device, a cost of service, a location of the computing device, a network response time measured at the computing device, a type of connected or available network associated with the computing device, or a particular subscriber plan or maximum network speed available to the computing device.

At step 616, responsive to one or more of the detected set of communication network parameters falling outside a defined set of acceptable communication network parameters (i) identify a third computing device having a set of communication network parameters that fall within the defined set of acceptable communication network parameters, and (ii) assign the third computing device for execution of the set of software program instructions previously assigned for execution to the selected computing device. So for example, where the selected computing device is the first computing device, the third computing device is assigned the first set of software instructions for execution, whereas if the selected computing device is the second computing device, the third computing device is assigned the second set of software instructions for execution.

Step 618 comprises receiving for execution, prior to termination of the initiated network communication session and/or prior to termination of the initiated instance of the software application, a second software program instruction corresponding to the initiated instance of the software application.

Step 620 comprises responding to the second software program instructions comprising part of the set of software program instructions that the third computing device has been assigned to execute (i.e. at step 616), by routing the second software program instruction to the third computing device and executing the second software program instruction at the third computing device.

In a specific embodiment, the invention provides a method for dynamic provisioning of processing functionality corresponding to an instance of a cloud based software application. The instance of the cloud based software application is executed at a cloud services server system, such that output data from the instance of the cloud based software application is streamed to and rendered on a client terminal that is interfaced with the cloud services server system through a network. The method comprises the steps of (i) initiating a network communication session between the client terminal and cloud services server system, for delivery of streaming data that is output from the instance of the cloud based software application, from the cloud services server system to the client terminal, (ii) assigning a plurality of computing devices to the instance of the cloud based software application, the plurality of computing devices comprising at least a first cloud services server, and a second computing device, (iii) assigning the first cloud computing server for execution of a first set of software application program instructions corresponding to the instance of the cloud based software application, the first set of software application program instructions having a first set of attributes, (iv) assigning the second computing device for execution of a second set of software application program instructions corresponding to the instance of the cloud based software application, the second set of software application program instructions having a second set of attributes, (v) receiving a first software application program instruction for execution, wherein said first software application program instruction is associated with functionality of the instance of the cloud based software application, (vi) selecting one of the first cloud services server and the second computing device as an instruction implementation device, for execution of the first software application program instruction, wherein (a) the first cloud services server is selected as the instruction implementation device in response to determining that the first set of software application program instructions includes the first software application program instruction, and (b) the second computing device is selected as the instruction implementation device in response to determining that the second set of software application program instructions includes the first software application program instruction, and (vii) routing the first software application program instruction to the selected instruction implementation device.

In a specific embodiment of the method, the routed first software application program instruction is executed at a processor within the selected instruction implementation device.

In another method embodiment, the second computing device is one of a second cloud services server and the client terminal.

In a further embodiment of the method, each of the first cloud computing server and the second computing device has at least one hardware capability or hardware configuration attribute that is different from the other of the first cloud computing server and the second computing device.

In a particular method embodiment, the method further includes (i) selecting a computing device from among the first cloud computing server and the second computing device, and detecting a set of communication network parameters associated with the selected computing device, (ii) responsive to one or more of the detected set of communication network parameters falling outside a defined set of acceptable communication network parameters, (a) identifying a third computing device having a set of communication network parameters that conform to the defined set of acceptable communication network parameters, and (b) assigning the third computing device for execution of the set of software program instructions previously assigned for execution to the selected computing device, (v) receiving, prior to occurrence of a defined termination event, a second software application program instruction for execution, wherein said second software application program instruction is associated with functionality of the instance of the cloud based software application, (vi) responding to a determination that the set of software application program instructions assigned to the third computing device includes the second software application program instruction, by routing the second software application program instruction to the third computing device, and (vii) executing the second software application program instruction at a processor within the third computing device.

In another embodiment of the method the defined termination event comprises any of termination of the network communication session between the client terminal and cloud services server system, and termination of the instance of the instance of the cloud based software application.

In a specific embodiment of the method, the detected set of communication network parameters comprises any one or more of time of day, current traffic load on a network to which the selected computing device is coupled, available bandwidth of the network to which the selected computing device is coupled, a received signal strength indication associated with the network to which the selected computing device is coupled, a number of communication sessions simultaneously being handled by the selected computing device. a measurable quality of service parameter associated with the selected computing device, a cost of service associated with the selected computing device, a location of the selected computing device, a network response time measured at the selected computing device, a subscriber plan associated with the selected computing device or with the network to which the selected computing device is coupled, and a maximum network speed available to the selected computing device.

The invention additionally provides a cloud services server system for dynamic provisioning of processing functionality corresponding to an instance of a cloud based software application. The instance of the cloud based software application is executed at the cloud services server system, wherein output data from the instance of the cloud based software application is streamed to and rendered on a client terminal that is interfaced with the cloud services server system through a network. The cloud services server system comprises a processor, and a non-transitory memory. The processor is configured to implement the steps of (i) establishing a network communication session between the client terminal and the cloud services server system, for delivery of streaming data that is output from the instance of the cloud based software application, from the cloud services server system to the client terminal, (ii) assigning a plurality of computing devices to the instance of the cloud based software application, the plurality of computing devices comprising at least a first cloud services server, and a second computing device, (iii) assigning the first cloud computing server for execution of a first set of software application program instructions corresponding to the instance of the cloud based software application, the first set of software application program instructions having a first set of attributes, (iv) assigning the second computing device for execution of a second set of software application program instructions corresponding to the instance of the cloud based software application, the second set of software application program instructions having a second set of attributes, (v) receiving a first software application program instruction for execution, wherein said first software application program instruction is associated with functionality of the instance of the cloud based software application, (vi) selecting one of the first cloud services server and the second computing device as an instruction implementation device, for execution of the first software application program instruction, wherein (a) the first cloud services server is selected as the instruction implementation device in response to determining that the first set of software application program instructions includes the first software application program instruction, and (b) the second computing device is selected as the instruction implementation device in response to determining that the second set of software application program instructions includes the first software application program instruction, and (vii) routing the first software application program instruction to the selected instruction implementation device.

In an embodiment, the cloud services server system may be configured such that, the routed first software application program instruction is executed at a processor within the selected instruction implementation device.

In a further embodiment, the cloud services server system is configured such that the second computing device is one of a second cloud services server and the client terminal.

In an embodiment of the cloud services server system, each of the first cloud computing server and the second computing device has at least one hardware capability OF hardware configuration attribute that is different from the other of the first cloud computing server and the second computing device.

In another embodiment of the cloud services server system, the processor is configured to implement the steps of (i) selecting a computing device from among the first cloud computing server and the second computing device, and detecting a set of communication network parameters associated with the selected computing device, (ii) responsive to one or more of the detected set of communication network parameters falling outside a defined set of acceptable communication network parameters (a) identifying a third computing device having a set of communication network parameters that conform to the defined set of acceptable communication network parameters, and (b) assigning the third computing device for execution of the set of software program instructions previously assigned for execution to the selected computing device, (iii) receiving, prior to occurrence of a defined termination event, a second software application program instruction for execution, wherein said second software application program instruction is associated with functionality of the instance of the cloud based software application, (iv) responding to a determination that the set of software application program instructions assigned to the third computing device includes the second software application program instruction, by routing the second software application program instruction to the third computing device, and (v) executing the second software application program instruction at a processor within the third computing device.

In a further embodiment of the cloud services server system, the defined termination event comprises any of termination of the network communication session between the client terminal and cloud services server system, and termination of the instance of the instance of the cloud based software application.

In a specific embodiment of the cloud services server system, the detected set of communication network parameters comprises any one or more of time of day, current traffic load on a network to which the selected computing device is coupled, available bandwidth of the network to which the selected computing device is coupled, a received signal strength indication associated with the network to which the selected computing device is coupled, a number of communication sessions simultaneously being handled by the selected computing device, a measurable quality of service parameter associated with the selected computing device, a cost of service associated with the selected computing device, a location of the selected computing device, a network response time measured at the selected computing device, a subscriber plan associated with the selected computing device or with the network to which the selected computing device is coupled, and a maximum network speed available to the selected computing device.

The invention also provides a computer program product for dynamic provisioning of processing functionality corresponding to an instance of a cloud based software application, wherein the instance of the cloud based software application is executed at a cloud services server system, and wherein output data from the instance of the cloud based software application is streamed to and rendered on a client terminal that is interfaced with the cloud services server system through a network. The computer program product comprising a non-transitory computer readable medium having a computer readable program code embodied therein, the computer readable program code comprising instructions for implementing the steps of (i) initiating a network communication session between the client terminal and cloud services server system, for delivery of streaming data that is output from the instance of the cloud based software application, from the cloud services server system to the client terminal, (ii) assigning a plurality of computing devices to the instance of the cloud based software application, the plurality of computing devices comprising at least a first cloud services server, and a second computing device, (iii) assigning the first cloud computing server for execution of a first set of software application program instructions corresponding to the instance of the cloud based software application, the first set of software application program instructions having a first set of attributes, (iv) assigning the second computing device for execution of a second set of software application program instructions corresponding to the instance of the cloud based software application, the second set of software application program instructions having a second set of attributes, (v) receiving a first software application program instruction for execution, wherein said first software application program instruction is associated with functionality of the instance of the cloud based software application, (vi) selecting one of the first cloud services server and the second computing device as an instruction implementation device, for execution of the first software application program instruction, wherein (a) the first cloud services server is selected as the instruction implementation device in response to determining that the first set of software application program instructions includes the first software application program instruction, and (b) the second computing device is selected as the instruction implementation device in response to determining that the second set of software application program instructions includes the first software application program instruction, and (vii) routing the first software application program instruction to the selected instruction implementation device.

Figure 7:
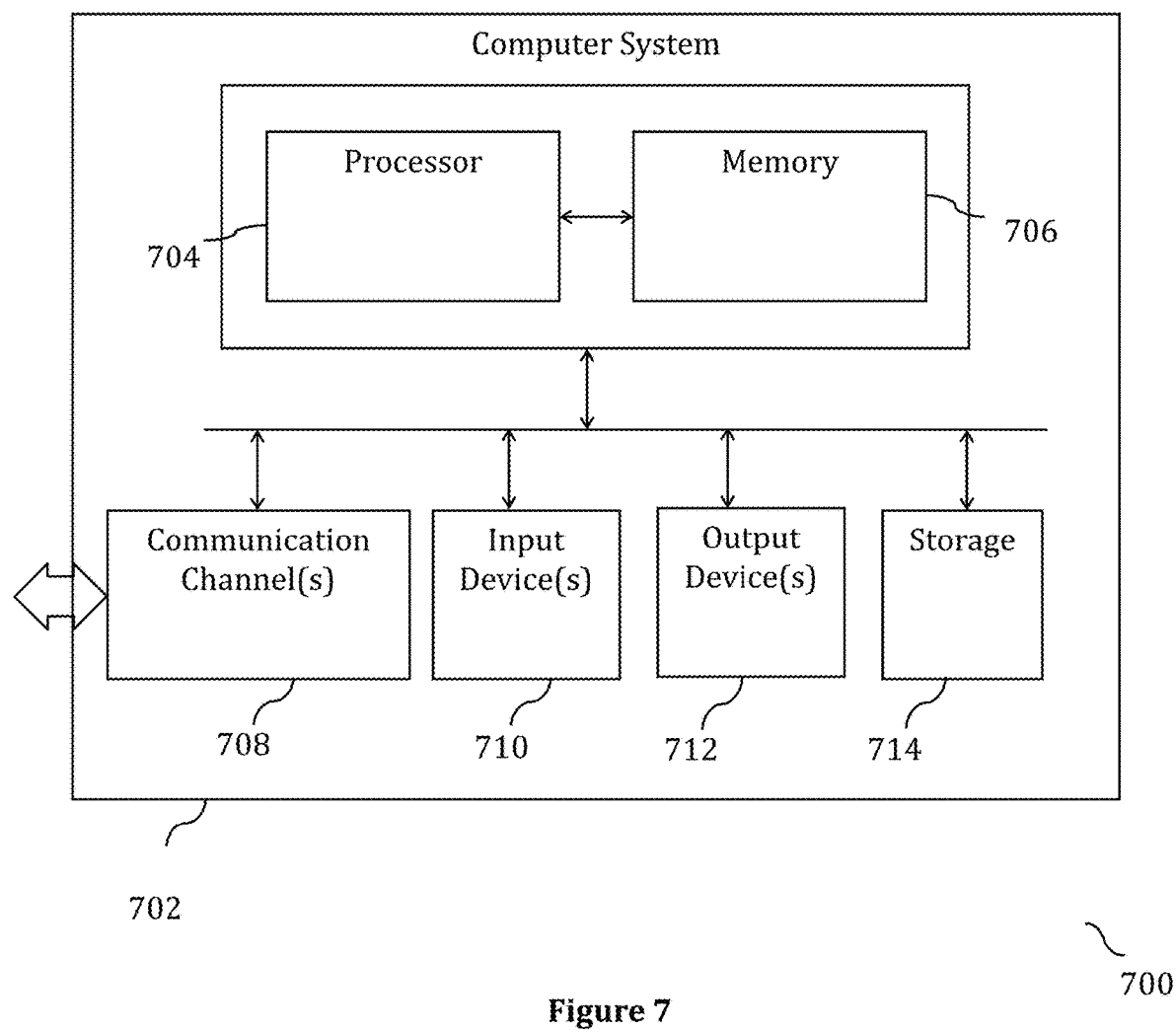
FIG. 7 illustrates an exemplary system for implementing the present invention.

FIG. 7 illustrates an exemplary system 700 for implementing the present invention. The illustrated system 700 comprises computer system 702 which in turn comprises one or more processors 704 and at least one memory 706. Processor 704 is configured to execute program instructions—and may be a real processor or a virtual processor. It will be understood that computer system 702 does not suggest any limitation as to scope of use or functionality of described embodiments. The computer system 702 may include, but is not be limited to, one or more of a general-purpose computer, a programmed microprocessor, a microcontroller, an integrated circuit, and other devices or arrangements of devices that are capable of implementing the steps that constitute the method of the present invention. Exemplary embodiments of a computer system 702 in accordance with the present invention may include one or more servers, desktops, laptops, tablets, smart phones, mobile phones, mobile communication devices, tablets, phablets and personal digital assistants. In an embodiment of the present invention, the memory 706 may store software for implementing various embodiments of the present invention. The computer system 702 may have additional components. For example, the computer system 702 may include one or more communication channels 708, one or more input devices 710, one or more output devices 712, and storage 714. An interconnection mechanism (not shown) such as a bus, controller, or network, interconnects the components of the computer system 702. In various embodiments of the present invention, operating system software (not shown) provides an operating environment for various softwares executing in the computer system 702 using a processor 704, and manages different functionalities of the components of the computer system 702.

The communication channel(s) 708 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 710 may include, but is not limited to, a touch screen, a keyboard, mouse, pen, joystick, trackball, a voice device, a scanning device, or any another device that is capable of providing input to the computer system 702. In an embodiment of the present invention, the input device(s) 710 may be a sound card or similar device that accepts audio input in analog or digital form. The output device(s) 712 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 702.

The storage 714 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 702. In various embodiments of the present invention, the storage 714 may contain program instructions for implementing any of the described embodiments.

In an embodiment of the present invention, the computer system 702 is part of a distributed network or a part of a set of available cloud resources.

The present invention may be implemented in numerous ways including as a system, a method, or a computer program product such as a computer readable storage medium OF a computer network wherein programming instructions are communicated from a remote location.

The present invention may suitably be embodied as a computer program product for use with the computer system 702. The method described herein is typically implemented as a computer program product, comprising a set of program instructions that is executed by the computer system 702 or any other similar device. The set of program instructions may be a series of computer readable codes stored on a tangible medium, such as a computer readable storage medium (storage 714), for example, diskette, CD-ROM, ROM, flash drives or hard disk, or transmittable to the computer system 702, via a modem or other interface device, over either a tangible medium, including but not limited to optical or analogue communications channel(s) 708. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

The invention accordingly enables dynamic provisioning of processing functionality for cloud based software program execution—wherein said dynamic provisioning may be implemented based on one more detected network parameters. The solutions of the present invention may be implemented within cloud based software services solutions, and/or within cloud based gaming solutions.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclose herein suitably may be practiced in the absence of any element which is not specifically disclosed herein—and in a particular embodiment specifically contemplated, is intended to be practiced in the absence of any element which is not specifically disclosed herein.

We claim:

1. A method for dynamic provisioning of processing functionality corresponding to an instance of a cloud based software application, wherein the instance of the cloud based software application is executed at a cloud services server system, and wherein output data from the instance of the cloud based software application is streamed to and rendered on a client terminal that is interfaced with the cloud services server system through a network, the method comprising the steps of:

initiating a network communication session between the client terminal and cloud services server system, for delivery of streaming data that is output from the instance of the cloud based software application, from the cloud services server system to the client terminal;

assigning a plurality of computing devices to the instance of the cloud based software application, the plurality of computing devices comprising at least a first cloud services server, and a second computing device;

assigning the first cloud computing server for execution of a first set of software application program instructions corresponding to the instance of the cloud based software application, the first set of software application program instructions comprising a plurality of software application program instructions, and having a first set of attributes;

assigning the second computing device for execution of a second set of software application program instructions corresponding to the instance of the cloud based software application, the second set of software application program instructions comprising a plurality of software application program instructions, and having a second set of attributes, wherein the second set of attributes are different from the first set of attributes;

receiving a first software application program instruction for execution, wherein said first software application program instruction is associated with functionality of the instance of the cloud based software application;

selecting one of the first cloud services server and the second computing device as an instruction implementation device, for execution of the first software application program instruction, wherein:
the first cloud services server is selected as the instruction implementation device in response to determining that the first set of software application program instructions includes the first software application program instruction; and
the second computing device is selected as the instruction implementation device in response to determining that the second set of software application program instructions includes the first software application program instruction;
routing the first software application program instruction to the selected instruction implementation device;
selecting a computing device from among the first cloud computing server and the second computing device, and detecting a set of communication network parameters associated with the selected computing device;
responsive to one or more of the detected set of communication network parameters falling outside a defined set of acceptable communication network parameters:
identifying a third computing device having a set of communication network parameters that conform to the defined set of acceptable communication network parameters, and
assigning the third computing device for execution of the set of software program instructions previously assigned for execution to the selected computing device;
receiving, prior to occurrence of a defined termination event, a second software application program instruction for execution, wherein said second software application program instruction is associated with functionality of the instance of the cloud based software application;
responding to a determination that the set of software application program instructions previously assigned to the selected computing device includes the second software application program instruction, by routing the second software application program instruction to the third computing device; and
executing the second software application program instruction at a processor within the third computing device.

2. The method as claimed in claim 1, wherein the routed first software application program instruction is executed at a processor within the selected instruction implementation device.

3. The method as claimed in claim 1, wherein the second computing device is one of a second cloud services server and the client terminal.

4. The method as claimed in claim 1 wherein each of the first cloud computing server and the second computing device has at least one hardware capability or hardware configuration attribute that is different from the other of the first cloud computing server and the second computing device.

5. The method as claimed in claim 1, wherein the defined termination event comprises any of:
termination of the network communication session between the client terminal and cloud services server system; and
termination of the instance of the instance of the cloud based software application.

6. The method as claimed in claim 1, wherein the detected set of communication network parameters comprises any one or more of time of day, current traffic load on a network to which the selected computing device is coupled, available bandwidth of the network to which the selected computing device is coupled, a received signal strength indication associated with the network to which the selected computing device is coupled, a number of communication sessions simultaneously being handled by the selected computing device, a measurable quality of service parameter associated with the selected computing device, a cost of service associated with the selected computing device, a location of the selected computing device, a network response time measured at the selected computing device, a subscriber plan associated with the selected computing device or with the network to which the selected computing device is coupled, and a maximum network speed available to the selected computing device.

7. A cloud services server system for dynamic provisioning of processing functionality corresponding to an instance of a cloud based software application, wherein the instance of the cloud based software application is executed at the cloud services server system, and wherein output data from the instance of the cloud based software application is streamed to and rendered on a client terminal that is interfaced with the cloud services server system through a network, the cloud services server system comprising:
a processor; and
a non-transitory memory
wherein the processor is configured to implement the steps of:
establishing a network communication session between the client terminal and the cloud services server system, for delivery of streaming data that is output from the instance of the cloud based software application, from the cloud services server system to the client terminal;
assigning a plurality of computing devices to the instance of the cloud based software application, the plurality of computing devices comprising at least a first cloud services server, and a second computing device;
assigning the first cloud computing server for execution of a first set of software application program instructions corresponding to the instance of the cloud based software application, the first set of software application program instructions comprising a plurality of software application program instructions, and having a first set of attributes;
assigning the second computing device for execution of a second set of software application program instructions corresponding to the instance of the cloud based software application, the second set of software application program instructions comprising a plurality of software application program instructions, and having a second set of attributes, wherein the second set of attributes are different from the first set of attributes;
receiving a first software application program instruction for execution, wherein said first software application program instruction is associated with functionality of the instance of the cloud based software application;
selecting one of the first cloud services server and the second computing device as an instruction implementation device, for execution of the first software application program instruction, wherein:
the first cloud services server is selected as the instruction implementation device in response to determining that the first set of software application program instructions includes the first software application program instruction; and
the second computing device is selected as the instruction implementation device in response to determining that the second set of software application program instructions includes the first software application program instruction;
routing the first software application program instruction to the selected instruction implementation device;
selecting a computing device from among the first cloud computing server and the second computing device, and detecting a set of communication network parameters associated with the selected computing device;
responsive to one or more of the detected set of communication network parameters falling outside a defined set of acceptable communication network parameters:
identifying a third computing device having a set of communication network parameters that conform to the defined set of acceptable communication network parameters, and
assigning the third computing device for execution of the set of software program instructions previously assigned for execution to the selected computing device;
receiving, prior to occurrence of a defined termination event, a second software application program instruction for execution, wherein said second software application program instruction is associated with functionality of the instance of the cloud based software application;
responding to a determination that the set of software application program instructions previously assigned to the selected computing device includes the second software application program instruction, by routing the second software application program instruction to the third computing device; and
executing the second software application program instruction at a processor within the third computing device.

8. The cloud services server system as claimed in claim 7, wherein the routed first software application program instruction is executed at a processor within the selected instruction implementation device.

9. The cloud services server system as claimed in claim 7, wherein the second computing device is one of a second cloud services server and the client terminal.

10. The cloud services server system as claimed in claim 7 wherein each of the first cloud computing server and the second computing device has at least one hardware capability or hardware configuration attribute that is different from the other of the first cloud computing server and the second computing device.

11. The cloud services server system as claimed in claim 7, wherein the defined termination event comprises any of:
termination of the network communication session between the client terminal and cloud services server system; and
termination of the instance of the instance of the cloud based software application.

12. The cloud services server system as claimed in claim 7, wherein the detected set of communication network parameters comprises any one or more of time of day, current traffic load on a network to which the selected computing device is coupled, available bandwidth of the network to which the selected computing device is coupled, a received signal strength indication associated with the network to which the selected computing device is coupled, a number of communication sessions simultaneously being handled by the selected computing device, a measurable quality of service parameter associated with the selected computing device, a cost of service associated with the selected computing device, a location of the selected computing device, a network response time measured at the selected computing device, a subscriber plan associated with the selected computing device or with the network to which the selected computing device is coupled, and a maximum network speed available to the selected computing device.

13. A computer program product for dynamic provisioning of processing functionality corresponding to an instance of a cloud based software application, wherein the instance of the cloud based software application is executed at a cloud services server system, and wherein output data from the instance of the cloud based software application is streamed to and rendered on a client terminal that is interfaced with the cloud services server system through a network, the computer program product comprising a non-transitory computer readable medium having a computer readable program code embodied therein, the computer readable program code comprising instructions for implementing the steps of:
initiating a network communication session between the client terminal and cloud services server system, for delivery of streaming data that is output from the instance of the cloud based software application, from the cloud services server system to the client terminal;
assigning a plurality of computing devices to the instance of the cloud based software application, the plurality of computing devices comprising at least a first cloud services server, and a second computing device;
assigning the first cloud computing server for execution of a first set of software application program instructions corresponding to the instance of the cloud based software application, the first set of software application program instructions comprising a plurality of software application program instructions, and having a first set of attributes;
assigning the second computing device for execution of a second set of software application program instructions corresponding to the instance of the cloud based software application, the second set of software application program instructions comprising a plurality of software application program instructions, and having a second set of attributes, wherein the second set of attributes are different from the first set of attributes;
receiving a first software application program instruction for execution, wherein said first software application program instruction is associated with functionality of the instance of the cloud based software application;
selecting one of the first cloud services server and the second computing device as an instruction implementation device, for execution of the first software application program instruction, wherein:
the first cloud services server is selected as the instruction implementation device in response to determining that the first set of software application program instructions includes the first software application program instruction; and
the second computing device is selected as the instruction implementation device in response to determining that the second set of software application program instructions includes the first software application program instruction;

routing the first software application program instruction to the selected instruction implementation device;

selecting a computing device from among the first cloud computing server and the second computing device, and detecting a set of communication network parameters associated with the selected computing device;

responsive to one or more of the detected set of communication network parameters falling outside a defined set of acceptable communication network parameters:

identifying a third computing device having a set of communication network parameters that conform to the defined set of acceptable communication network parameters, and assigning the third computing device for execution of the set of software program instructions previously assigned for execution to the selected computing device;

receiving, prior to occurrence of a defined termination event, a second software application program instruction for execution, wherein said second software application program instruction is associated with functionality of the instance of the cloud based software application;

responding to a determination that the set of software application program instructions previously assigned to the selected computing device includes the second software application program instruction, by routing the second software application program instruction to the third computing device; and executing the second software application program instruction at a processor within the third computing device.

* * * * *

UNITED STATES PATENT AND TRADEMARK OFFICE
CERTIFICATE OF CORRECTION

PATENT NO. : 12,413,636 B2  
APPLICATION NO. : 17/962437  
DATED : September 9, 2025  
INVENTOR(S) : Suman Saraf Page 1 of 1

It is certified that error appears in the above-identified patent and that said Letters Patent is hereby corrected as shown below:

In the Claims

Column 17, Line 52, Claim 4, delete "cach" and insert -- each --

Column 17, Line 63, Claim 5, delete "of the instance of the instance" and insert -- of the instance --

Column 19, Line 61, Claim 11, delete "of the instance of the instance" and insert -- of the instance --

Signed and Sealed this  
Twenty-eighth Day of October, 2025

John A. Squires  
*Director of the United States Patent and Trademark Office*